April 9, 1940.  J. T. LAWRENCE  2,196,773
COTTON CLEANING MACHINE
Filed Jan. 26, 1939  4 Sheets-Sheet 1
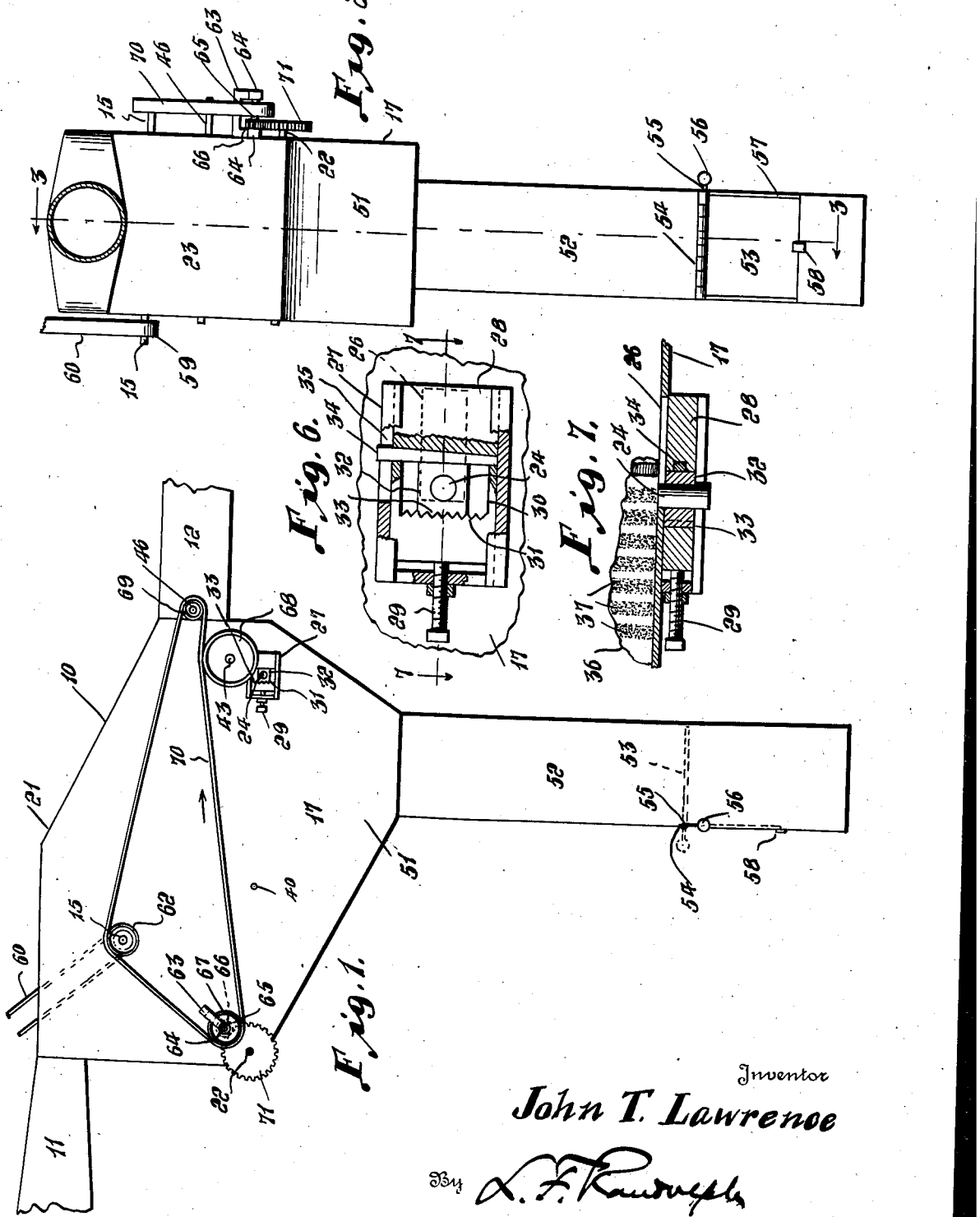
Inventor
John T. Lawrence
By L. F. Randolph
Attorney

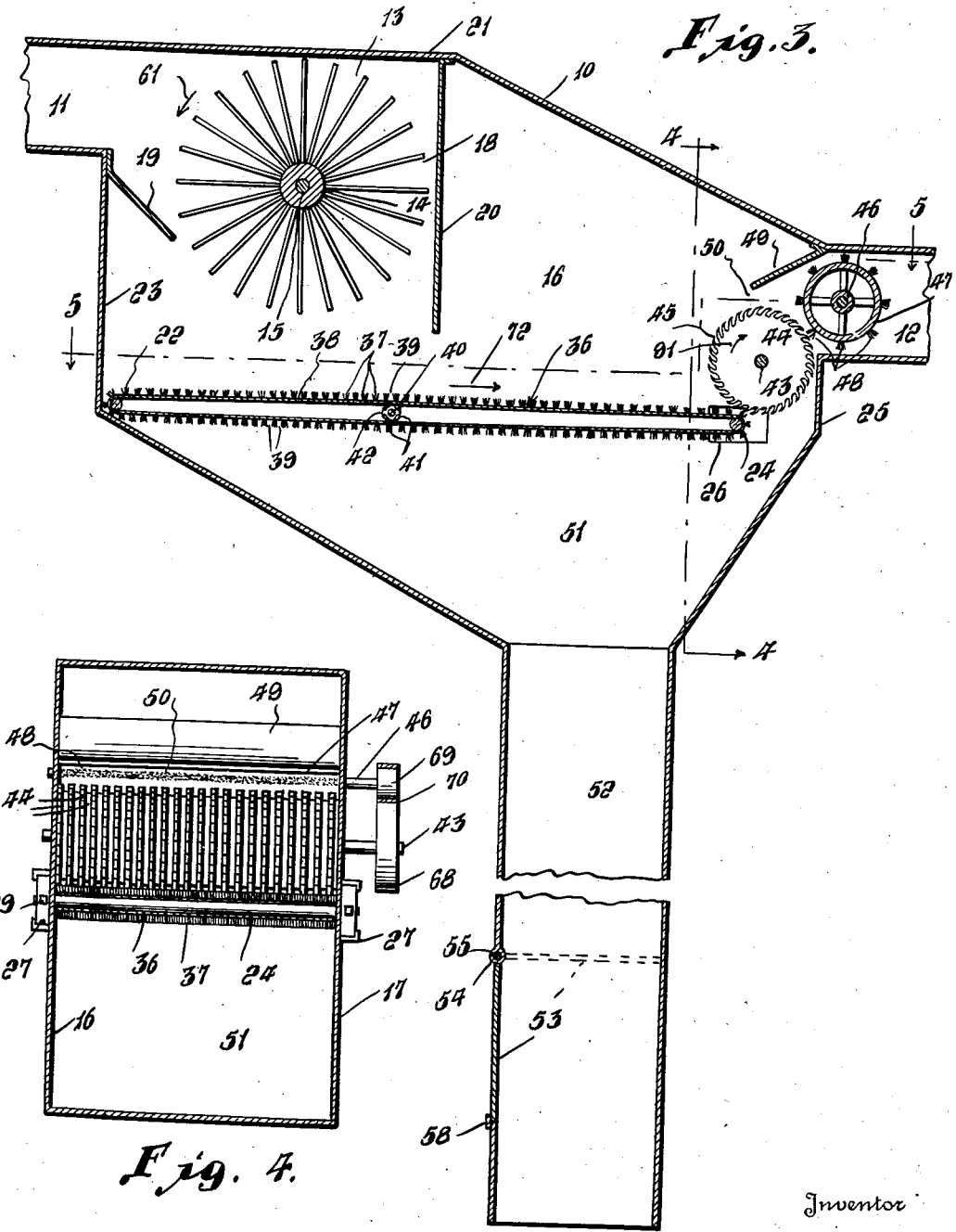

April 9, 1940. J. T. LAWRENCE 2,196,773
COTTON CLEANING MACHINE
Filed Jan. 26, 1939 4 Sheets-Sheet 3
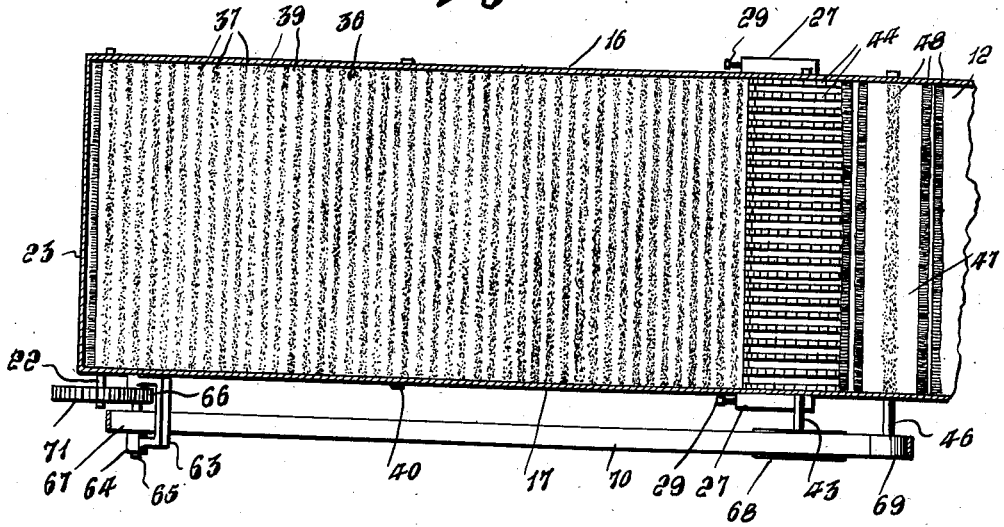
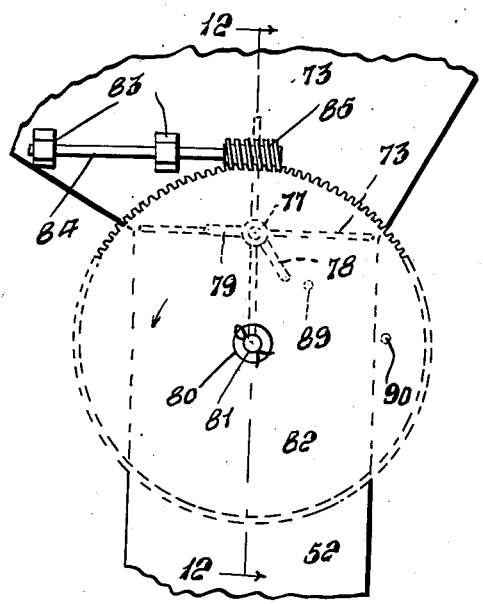
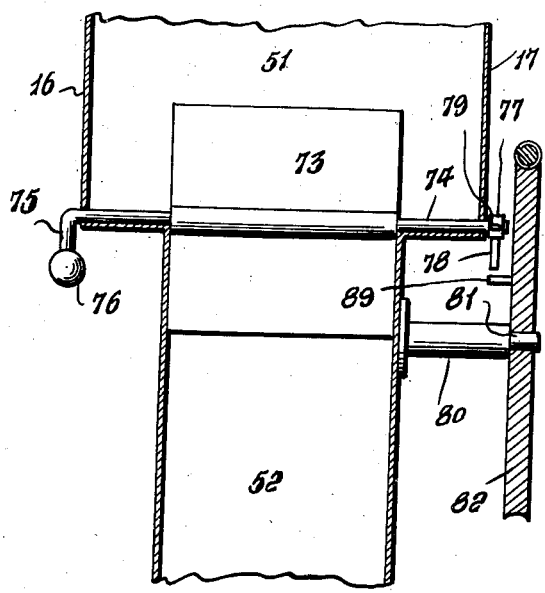
Inventor
John T. Lawrence

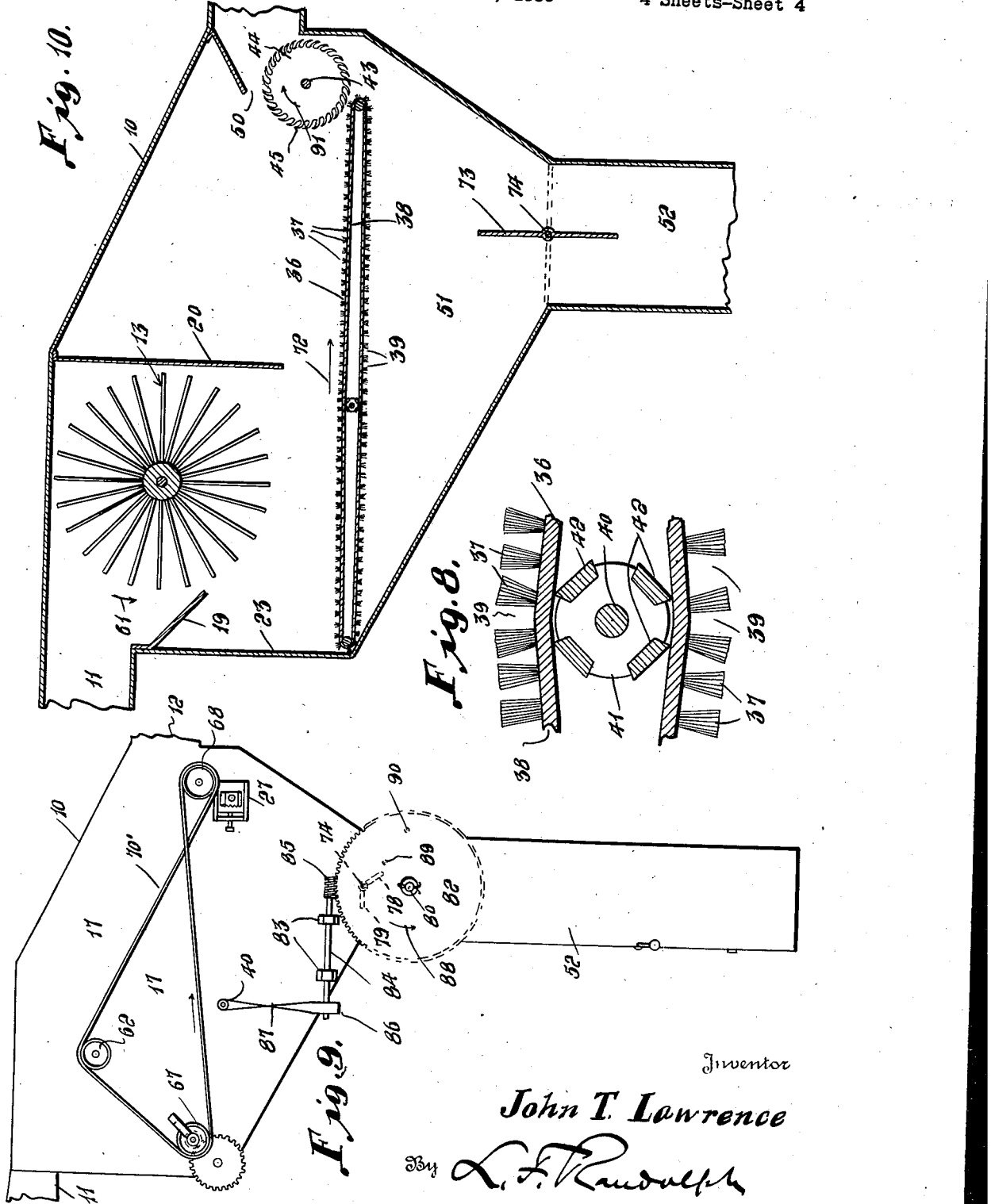

Patented Apr. 9, 1940

2,196,773

UNITED STATES PATENT OFFICE 2,196,773

COTTON CLEANING MACHINE

John T. Lawrence, Inman, S. C.

Application January 26, 1939, Serial No. 252,987

12 Claims. (Cl. 19—35)

This invention relates to an improved machine for cleaning and removing foreign matter such as hulls, limbs, leaves, stones and the like from harvested cotton before the cotton is passed through a gin or cotton mill.

More particularly, it is an aim of this invention to provide a cleaning machine adapted to be partially operated by the suction apparatus used for drawing the cotton into a gin, or cotton mill, for drawing the cotton through a casing provided with driven means for breaking up the cotton bolls or lint to separate the foreign matter therefrom and conveying means for carrying the cotton and foreign matter and for holding the foreign matter while the cotton is being removed to thereby clean the cotton and thereafter release the foreign matter so that it may pass outwardly through the bottom of the casing.

More particularly, it is an aim of this invention to provide a cleaner for cotton including a revolving beater adapted to receive the cotton and to direct it centrifugally against baffle members to break up the cotton bolls or lint so that the foreign matter will be separated from the lint and seed and so that the fibrous cotton and foreign matter will be finally directed by gravity onto an endless conveyor having means for receiving and holding the heavy foreign matter so that the light fibrous cotton may be picked therefrom and directed to an outlet and thereby separated from the foreign particles.

Still another object of the invention is to provide an improved means for actuating a valve mounted in the waste outlet at the bottom of the machine for periodically releasing the waste matter so that the suction by means of which the cotton is drawn through the machine will not be appreciably diminished.

It is a particular aim of this invention to provide an improved endless conveyor having transversely disposed brush elements or tufts extending the width thereof and forming restricted spaces therebetween, and idler means disposed between said conveyor for forcing it outwardly to spread the tufts or brush elements so that the foreign matter may be lodged therebetween and held while the fibrous cotton is being removed to thereby clean the cotton.

Other objects and advantages of the invention will hereinafter become more fully apparent from the following description of the drawings, which illustrate a preferred embodiment of the invention, and wherein:

Figure 1 is a side elevational view of the cleaner,

Figure 2 is an end view in elevation of the same looking toward its inlet end,

Figure 3 is a longitudinal vertical sectional view taken along the line 3—3 of Figure 2, Figure 4 is a transverse vertical sectional view taken along the line 4—4 of Figure 3, Figure 5 is a horizontal sectional view taken along the line 5—5 of Figure 3, Figure 6 is an enlarged side elevational view partly in section showing one of the conveyor tensioning members, Figure 7 is a horizontal sectional view taken along the line 7—7 of Figure 6, Figure 8 is an enlarged fragmentary side elevational view partly in section showing the means for separating the tufts or brush elements on the endless conveyor, Figure 9 is a view similar to Figure 1 of a slightly modified form of the cleaning machine, Figure 10 is a view similar to Figure 3 of the modification, Figure 11 is a fragmentary side elevational view, on an enlarged scale, of the operating means for the valve employed in the modification of the cleaning machine, and Figure 12 is a vertical sectional view taken along the line 12—12 of Figure 11.

Referring more particularly to the drawings, wherein like reference characters designate like or corresponding parts throughout the different views, 10 designates generally a casing having an inlet 11 at one end thereof, and an outlet 12 at its opposite end. The outlet end 12 of the casing 10 is adapted to be either connected directly to the inlet side of a cotton gin, not shown, so that the suction apparatus thereof will create a suction in casing 10 whereby cotton may be drawn inwardly through the inlet 11, or suitable suction apparatus, not shown, may be provided in the outlet 12 to accomplish the same result.

As best seen in Figure 3, the inlet 11 is disposed above the level of the outlet 12 and a beater 13 is mounted within and adjacent the top of the casing 10 adjacent the inlet 11. Beater 13 includes a hub 14 which is keyed to a shaft 15 which is journaled in the sides 16 and 17 of the casing 10. Hub 14 is provided with the outwardly projecting radially disposed tines or blades 18 which constitute the beating elements of the beater 13 and which extend the length of the hub 14 which in turn extends substantially across the top portion of the casing 10 so that all the cotton entering through inlet 11 will be engaged by the tines 18. A baffle 19 is mounted in the casing 10 directly beneath the inlet 11 and extends the width thereof, said baffle being inclined inwardly and downwardly of the casing with its free edge disposed adjacent to the periphery of beater 13. A wall or partition 20 is secured to the top 21 of the casing 10 and depends downwardly therefrom to a point slightly below the lowermost point of the beater 13. Partition 20 likewise extends the width of casing 10 and is disposed on the opposite side of the beater 13 to the baffle 19 so that it combines with said baffle to form an opening in the casing 10 beneath the beater through which the cotton may drop downwardly.

A shaft 22 extends transversely through the casing 10 adjacent the end 23 thereof and is journaled in the sides 16 and 17. A similar shaft 24 extends transversely through casing 10 adjacent its outlet end 25 and has its ends projecting through a relatively large opening 26 in the sides 16 and 17.

Secured to the outer sides of the sides 16 and 17 and surrounding the opening 26 are the guideways 27, as best seen in Figures 6 and 7. Guideways 27 slidably mount the blocks 28 each of which is adapted to be moved relatively thereto by means of a screw follower 29 mounted in one end of the guideway 27. Each of the blocks 28 is provided with an opening 30, intermediate of its ends, along one side of which is formed the teeth 31. A bearing member 32 is adapted to be loosely positioned in each of the openings 30 for vertical movement relatively thereto and have teeth 33 form along one of its sides to interengage the teeth 31. A wedge member 34 extends transversely through each block 28 and through its opening 30 to engage the opposite side of the bearing member 32 to hold its teeth in wedging engagement with the teeth 31 to thereby adjustably position the bearing member 32 transversely of the block 28 and vertically of the casing 10. A slot 35 is formed in the top of each guide member 27 in which the upper end of the wedge 34 can move when its block 28 is moved longitudinally of the casing 10 and of the guide member 27 by operation of the follower 29. The ends of the shaft 24 are journaled in the bearing members 32 and supported thereby transversely of the casing 10.

An endless conveyor belt 36 is trained over the shafts 22 and 24 so that it extends substantially the length of the casing 10 and from the side 16 to the side 17 thereof, as best seen in Figure 5. Conveyor 36 is disposed substantially below the level of the free edge of the partition 20 so that one end thereof is disposed beneath and spaced from the beater 13. The conveyor 36 includes the brush elements or tufts 37 which are secured to the belt portion 38 thereof on its outer side to project outwardly therefrom. These brush elements 37 are in the form of elongated tufts which extend the width of the belt 38 and which are disposed in substantially parallel spaced relationship so that due to their natural tendency to spread they form the transverse spaces 39 therebetween each of which converges outwardly, for a purpose which will hereinafter be described. Brush elements 37 may be formed of any suitable material such as bristles or soft rubber or any other material sufficiently rigid to stand straight out from the belt 38 to form the spaces 39 therebetween and yet sufficiently flexible to expand so that each element 37 diverges outwardly.

A shaft 40 extends transversely through the casing 10 and has its ends journaled in the sides 16 and 17 thereof, and is disposed to extend through the conveyor 36 intermediate of its ends. As best seen in Figure 8, a roller 41 is keyed to the shaft 40 and is provided with the spaced longitudinally disposed slats 42 which are adapted to engage the inner side of the belt 38 and which constitute the periphery of the roller 41 which is substantially larger than the shafts 22 and 24 so that the belt 38 is thereby forced outwardly to cause the elements 37 of that portion of the belt 38 which is in engagement with the roller 41 to be spread apart to thereby enlarge spaces 39, for a purpose which will hereinafter be described.

A shaft 43 is journaled in the sides 16 and 17 and is disposed above the shaft 24 and between it and the outlet 12. A battery of disks 44 are keyed to the shaft 43 with their sides in abutting relationship. The battery of disks 44 extends the width of the casing 10, and each of the disks is provided with a series of outwardly projecting correspondingly curved teeth 45 which extend entirely around their peripheries. Shaft 24 is adapted to be positioned so that the brush elements 37 when passing thereover will be substantially in contact with the teeth 45, as illustrated in Figure 3.

A shaft 46 extends through the inner end of the outlet 12 and is disposed transversely thereof with its ends journaled in the side walls of the outlet, to support a drum 47 which is keyed thereto and which is of the same length as the battery of disks 44. Drum 47 is provided with a series of outwardly projecting longitudinally disposed brush elements 48 which project outwardly from its periphery and which extend the length thereof and are adapted to substantially contact teeth 45 of the disks 44, as seen in Figure 3, for a purpose which will hereinafter be described. A baffle 49 is secured to the top of the inner end of the outlet 12 and extends inwardly and downwardly therefrom with its free edge disposed above and slightly spaced from the top of the disks 44 to form a relatively narrow passage 50 between the interior of the casing 10 and the outlet 12.

Casing 10 is provided with a converging bottom 51 beneath the endless conveyor 36 and provided with an outlet passage 52 formed integral with the converging ends thereof and preferably disposed adjacent to the outlet end 25 of the casing 10. Outlet 52 is open at its bottom and as best seen in Figure 2, has a flap valve 53 formed in one side thereof, adjacent its outlet end, which is hinged along its upper edge at 54 by means of a hinge pin 55 which is secured to the hinged portions 54 which are formed integral with the flap valve 53 so that the hinge pin 55 turns with the flap valve. Hinge pin 55 is provided with an angularly disposed end having a weight 56 and this weight supporting end is disposed at right angles to the valve 53 to normally retain it in a closed position, as seen in Figure 1, horizontally of the passage 52. As best seen in Figure 2, passage 52 is provided with an opening 57 in one side thereof and directly beneath the hinge 54, into which the flap valve 53 fits when in an open position and a lug 58 may be provided on the outer side of the passage 52 to project into the opening 57 to limit the outward movement of the valve.

As best seen in Figures 1 and 2, shaft 15 extends beyond the sides 16 and 17 and has a pulley 59 keyed to the end which projects beyond the side 16 and over which is trained a belt 60 which is connected to a suitable source of power, not shown, for driving shaft 15. Shaft 15 revolves the beater 13 in the direction as indicated by the arrow, designated 61, in Figure 3. A pulley 62 is keyed to the other end of the shaft 15 on the outer side of side 17 and spaced therefrom, as seen in Figure 2. A U-shaped member 63 has one of its legs secured to the outer side of side 17 and projects outwardly therefrom with its ends provided with openings to form the bearing 64 in which is journaled a shaft 65 to which is keyed a pinion 66 and a pulley 67 which are spaced from each other and which are disposed between the ends of the member 63 with the pulley 67 adjacent the outer end of the shaft 65 and in a vertical plane with the pulley 62. A pulley 68, of substantially greater diameter than the pulleys 62 and 67 is keyed to one end of the shaft 43 and a pulley 69, of a diameter substantially less than the pulleys 62 and 67 is keyed to one end of the shaft 46, pulleys 68 and 69 being likewise in the same vertical plane as the pulley 62. A belt 70 is trained over pulleys 62, 67 and 69 and the upper portions of pulley 68 for driving the shafts 65 and 46 in a counterclockwise direction, as seen in Figure 1, and for driving the shaft 43 in a clockwise direction. A gear 71 is keyed to shaft 22 and meshes with the pinion 66 to drive this shaft in a clockwise direction to cause the endless conveyor 36 to move in the direction indicated by the arrow 72, in Figure 3. The shaft 24 and shaft 40 are idler shafts, so that the conveyor 36 is driven entirely by its shaft 22.

In the modified form of the cleaning machine, as shown in Figures 9 to 12, an additional valve is provided at the upper end of the waste outlet passage 52 which is preferably in the form of a butterfly valve, designated 73 which is provided with a shaft 74 which extends transversely through passage 52, at its upper end, and is journaled in the opposite sides thereof to mount the valve 73 for closing the entrance between bottom 51 and passage 52, when in its dotted line position, as seen in Figure 10. The ends of the shaft 74 extend outwardly beyond the sides 16 and 17 and at one end is bent downwardly to form the arm 75 disposed at right angles to the shaft 74 and which is provided at its free end with a weight 76. Arm 75 is disposed substantially in a plane parallel to the plane of the flap valve 73, for a purpose which will hereinafter be described. The shaft 74, at its opposite end, is provided with a bell crank 77 which is disposed beyond the side 17 and which comprises the arms 78 and 79.

A bearing member 80 is secured to the side wall of the passage 52 and projects outwardly therefrom beyond and beneath the side 17 to journal a stub shaft 81, one end of which projects beyond the free end of the bearing 80 to rotatably mount a worm wheel 82 which is keyed thereto. A pair of bearing members 83 are secured to and project outwardly from the side 17 to mount a shaft 84 which is journaled therein and held in spaced apart relationship to the side 17 thereby. A worm 85 is keyed to one end of the shaft 84 to mesh with worm wheel 82 and a drive pulley 86 is keyed to the opposite end and connected to idler shaft 40 by a belt 87 for driving the shaft 84 from the endless conveyor 36 to revolve the worm wheel 82 in a counterclockwise direction as indicated by the arrow 88, in Figure 9.

Wheel 82 is provided with the studs 89 and 90 which project inwardly from one side thereof toward the passage 52; stud 89 is disposed relatively close to the axis of the wheel 82 while the stud 90 is disposed adjacent to its periphery and spaced therefrom so that when the wheel 82 is turning in a counterclockwise direction and the bell crank 77 is in the position as seen in Figure 11, which is the position that it will assume when the valve 73 is open, stud 89 will engage arm 78 thereof to swing it through an arc of substantially 90° to thereby move the valve 73 through an arc of substantially 90°, in a clockwise direction, from its full line position as seen in Figure 10 to its dotted line or closed position. At this point arm 78 will be released by the stud 89 which will move under the free end thereof. This movement of the bell crank 77 will position the arm 79 so that it is projecting substantially upwardly and directly in the path of the stud 90 to be engaged thereby and moved back to its full line position, as seen in Figure 9, to rock the valve 73 in a counterclockwise direction back to its open position. Weight 76 is provided merely to prevent the valve from vibrating, when in an open position, and is not sufficiently heavy to open the valve after it has been moved to a closed position. It will thus be seen that valve 73 is periodically opened and closed when the cleaning machine is in operation and the studs 89 and 90 are so positioned that the valve will be held in a closed position for a much shorter period than in an open position for a reason which will hereinafter be described. The valve means 73 is employed in combination with all of the other parts heretofore described except the wiping drum 47 which may be dispensed with when the valve 73 is used.

As previously mentioned, suitable suction apparatus is adapted to be provided either directly in the outlet 12 or in a cotton gin to which this outlet is connected to provide a draft through casing 10 so that cotton which has been harvested either by hand or by machinery can be drawn inwardly through inlet 11. The machinery disposed within the casing 10 will be driven by means of the belt 60, as heretofore described in the direction as indicated by the arrows, heretofore referred to, when the suction means is in operation so that the cotton entering through inlet 11 will immediately be caught by the blades 18 of the beater 13, which is revolving in a counterclockwise direction as indicated by the arrow 61 so that a majority of this cotton will be hurled outwardly by centrifugal force either against the baffle 19 or the partition 20 and by the impact therewith foreign matter such as leaves, limbs, stones, branches and the like, which may be carried by the cotton and which is heavier than the cotton lint containing the seed, will be thereby torn loose from the cotton so as to drop downwardly onto the endless conveyor 36 between shaft 40 and shaft 22. Some of the light fibrous cotton when released from the foreign matter will be drawn by the suction in casing 10 directly toward the outlet 12 without coming in contact with the endless conveyor 36 while the remainder of the cotton will drop onto the conveyor to be carried toward the outlet 12 thereby. As the conveyor moves over the roller 41 the brush members 37 are successively spread, as best indicated in Figure 8, so that the foreign matter, which is usually heavy, will drop into the spaces 39 and be held therein by the brush members 37 when they again assume their normal position, which restricts the outlet of these spaces, while the light fluffy cotton will be supported and remain on top of these tufts or brush elements until they substantially reach the other end thereof at which point they will be engaged by the teeth 45 of the disks 44 which are revolving in a clockwise direction, as indicated by the arrow 91, in Figures 3 and 10. It will be noted that the teeth 45 are curved in the direction of the movement of the disks 44 and as these teeth move relatively close to one end of the endless conveyor 36 the light fluffy cotton will be readily engaged thereby and carried upwardly and around the battery of disks through the space 50 after which they will be engaged by the brush elements 48 of the wiper drum 47, which is moving in a counter-clockwise direction, so that the brush elements 48 will readily wipe the cotton off of the teeth 45 and direct it into the outlet 12 through which it will be readily drawn by the suction therein. The remainder of the cotton which fails to lodge on the belt or conveyor 36 will be drawn directly toward outlet 12 where due to the restricted passage 50 it will likewise be caught by the teeth 45 and carried into position to be wiped therefrom by the brush elements 48. It will thus be seen that all of the light fluffy cotton will thus be separated from the heavy foreign matter and directed into the outlet 12. As heretofore described and as best illustrated in Figure 1, pulley 68 is of a diameter several times larger than the pulley 69 so that as a result thereof the disks 44 are revolving much slower than drum 47 so that all of the teeth 45 will be engaged by the brush elements 48 at each revolution of the disks to thereby insure that all of the cotton carried by the teeth will be removed before they move past the drum 47. The foreign matter which is lodged in the spaces 39 will pass under the disks 44 and as the belt 38 passes around the idler shaft 24 the tufts or brush elements 37 will be spread so that a portion of this foreign matter will be released to drop downwardly into the bottom 51 while the rest of the foreign matter will be carried along until the belt again reaches the roller 41 at which point tufts 37 will again be spread and due to the fact that the tufts 37 and the spaces 39 are now in an inverted position the heavy foreign matter will readily drop out of these spaces and into the bottom 51 where due to its converging construction the foreign matter will be directed toward the outlet passage 52 where it will drop downwardly to lodge on the valve 53 which is in its closed position, or dotted line position, as seen in Figure 3, being held there by the weight 56 and the suction in casing 10. The foreign matter will thus be held in the upper part of outlet 52 until it accumulates to a point where its weight is sufficient to overcome the suction in casing 10 and counterbalance the weight 56 when the valve 53 will be opened by gravity to release the waste matter out of the free end of passage 52, or until the cleaner ceases to operate when if the foreign matter is sufficient to overcome the counterbalancing weight 56 it can open the valve 53 and be released.

In a modified form of the invention, as illustrated in Figures 9 to 12, if the wiping drum 47 is dispensed with the belt designated 70' will be trained over the top of pulley 62 around the under side of pulley 67 and then over the top and around the under side of the pulley 68 so that when the belt 70' is moving in the direction as indicated by the arrow in Figure 9, the pulleys 62 and 67 will be driven in a counter-clockwise direction and pulley 68 will be driven in a clockwise direction, and where the wiping drum 47 is dispensed with pulley 68 may be of the same size as pulleys 62 and 67. The operation of the modified form of the cleaning apparatus is the same up to the point at which the cotton is picked up by the teeth 45 but instead of being wiped off by the brush elements 48 the cotton is drawn off of the teeth while passing through passage 50 due to the increased suction in the outlet 12 caused by the removal of the obstruction formed by the drum 47 so that the cotton is drawn by the draft of air off of the teeth and carried through the passage 12. The foreign matter is released from the conveyor 36 in the same manner as heretofore described and dropped into the bottom 51 and is held there by the valve 73 when in its closed position until the valve is opened by engagement of arm 78 with stud 89 to release the foreign matter into the passage 52 where it will come to rest on the valve 53. Studs 89 and 90, as heretofore mentioned are so arranged that the valve 73 is held open for a relatively long period to dump the foreign matter contained in bottom 51 and a back pressure through passage 52 is prevented during this time due to the valve 53 being closed. The valve 73 is then closed for an instant so that the suction in passage 52 is released allowing the weight of the foreign matter in the upper part of the passage to open the valve 53 so that it can be released therefrom after which valve 53 again moves to a closed position when valve 73 is again opened.

Various modifications and changes in the precise arrangement and construction of the parts forming the cotton cleaning machine are contemplated and may obviously be resorted to, and the right is therefore expressly reserved to make such variations and changes as do not depart from the spirit and scope of the invention as hereinafter defined by the appended claims.

I claim as my invention:

1. A cotton cleaning machine comprising a casing having an inlet at one end thereof, a revolving beater disposed adjacent said inlet, baffles disposed on opposite sides of said beater and adapted to receive the cotton therefrom and to direct it downwardly, an endless conveyor, extending substantially the length of said casing, and disposed beneath said baffles and adapted to receive the cotton therefrom, said endless conveyor being provided with transversely disposed flexible slat elements, means intermediate of the ends of said conveyor and over which it is trained for opening said slat elements so that the foreign particles carried by the cotton can lodge between said slats, an outlet at the opposite end of said casing, revolving means disposed adjacent said outlet for picking the cotton lint off of said conveyor to direct it to said outlet, and an outlet in the bottom of said casing for the foreign matter which is adapted to be released from said slats when in an inverted position.

2. A device as in claim 1, and tensioning means for said endless conveyor and movable horizontally and vertically relatively to said casing for adjustably positioning one end of said conveyor relatively to said last mentioned means.

3. A device as in claim 1, comprising a valve pivotally mounted in said last mentioned outlet and provided with a weight for normally holding it in a closed position for closing its outlet, said valve being adapted to be periodically opened by the weight of the foreign matter in the bottom of said casing for releasing it therefrom.

4. A device as in claim 1, comprising a butterfly valve mounted in said last mentioned outlet, a shaft connected to said valve and journaled in said casing, a bell crank keyed to one end of said shaft, a bearing projecting outwardly from said casing and having a stub shaft journaled therein, a gear keyed to said stub shaft and provided with studs projecting from one side thereof in spaced apart relationship relatively to each other and to the axis of said gear, and means for revolving said gear from said endless conveyor whereby said studs will periodically engage the arms of said bell crank to alternately open and close the butterfly valve.

5. A cotton cleaning machine comprising a casing having an inlet at one end thereof and an outlet at its opposite end, an endless conveyor disposed adjacent the bottom of said casing and extending substantially the length thereof, a revolving beater mounted above one end of said conveyor and adjacent the inlet end of said casing, said conveyor being provided with outwardly projecting tufts of bristles each extending the width thereof, said tufts being disposed relatively close to each other, means intermediate the ends of said conveyor for spreading said tufts, said conveyor being adapted to support and convey the cotton directed thereon from said beater, and revolving toothed means adjacent the outlet end of said casing and disposed adjacent one end of said conveyor for removing the cotton lint from said tufts and for directing it toward said outlet.

6. A device as in claim 5, said casing being provided with a waste outlet in its bottom, disposed beneath the under side of said endless conveyor and adapted to receive foreign matter lodged between said tufts and released when said tufts are spread while in an inverted position.

7. In a cotton cleaning machine, an endless conveyor adapted to receive and convey the cotton after it has been beaten to release the foreign matter from the lint, said conveyor being provided with transverse tufts of outwardly projecting relatively flexible material, said tufts being disposed relatively close to each other with each of said tufts diverging toward its outer free end thereby forming a plurality of transverse spaces around the outer side of said conveyor each having a restricted opening at its outer end, and an idler disposed intermediate the ends of said endless conveyor of sufficient size to force the intermediate portion thereof outwardly for opening the spaces between said tufts whereby the foreign matter carried by the cotton may lodge in said spaces while the lint will be supported on said tufts.

8. A device as in claim 7, comprising a casing in which said endless conveyor is mounted, shafts over which the ends of said conveyor are trained, and means for adjustably positioning one of said shafts, relatively to the other shaft, comprising guideways mounted on the sides of said casing, blocks slidably mounted in said guideways, followers mounted in said guideways for moving the blocks relatively thereto, each of said blocks being provided with an opening having teeth along one side thereof, a bearing member mounted in each of said openings in which the ends of said shaft are journaled, said bearing members having teeth along one of their sides to engage the toothed sides of said openings for adjustably positioning the bearing members relatively to said openings, and wedge means carried by said blocks for wedging the bearing members against the toothed portions of the blocks.

9. A cotton cleaning machine including a casing having an inlet and an outlet, an endless conveyor belt mounted in said casing for conveying cotton from said inlet to said outlet, a toothed member rotatably mounted in the casing adjacent its outlet for removing the cotton from the conveyor, a revolving wiper mounted in the outlet for removing the cotton from the toothed member, driving means for the conveyor, toothed member and wiper, said conveyor having means for receiving and holding the foreign matter to separate it from the cotton and for releasing the foreign matter when on the underside of the conveyor, a waste outlet in the bottom of said casing, a butterfly valve mounted in said outlet and keyed to a shaft having a bell crank on one end thereof, a gear having a shaft journaled in said casing, studs projecting from one side of said gear and disposed in spaced apart relationship relatively to each other and to the axis of the gear, and power take off means for driving said gear, at a reduced speed, from said endless conveyor whereby said studs will alternately engage the arms of the bell crank to periodically open and close the valve.

10. A cotton cleaning machine including a casing having an inlet and an outlet, an endless conveyor belt mounted in said casing for conveying cotton from said inlet to said outlet, a toothed member rotatably mounted in the casing adjacent its outlet for removing the cotton from the conveyor, a revolving wiper mounted in the outlet for removing the cotton from the toothed member, driving means for the conveyor, toothed member and wiper, said conveyor having means for receiving and holding the foreign matter to separate it from the cotton and for releasing the foreign matter when on the underside of the conveyor, a waste outlet passage in the bottom of said casing, and a valve mounted therein for closing the passage when the device is in operation and for opening when the device is not in operation for releasing the waste matter collected thereon.

11. A cotton cleaning machine comprising a casing having an outlet for connecting with the inlet passage of a gin or cotton mill and an inlet for receiving cotton, remotely disposed relatively to said outlet, the cotton being adapted to be drawn through said casing by the suction from the gin or cotton mill, baffles disposed adjacent the inlet end of the casing and converging and opening downwardly, a revolving beater mounted in said casing adjacent its inlet end and between said baffles for receiving the cotton and for directing it centrifugally against said baffles to separate the lint from the foreign matter, an endless conveyor disposed in the casing beneath the baffles and extending from side to side thereof and from one end of the casing to a point adjacent the opposite end, said endless conveyor comprising a belt provided with spaced transversely disposed tufts on its outer side and extending the width thereof, said tufts being flexible and converging outwardly to form spaced recesses therebetween having restricted openings, said belt having one end disposed beneath the baffles and beater for receiving the cotton and waste matter therefrom, means intermediate the ends of said conveyor for spreading the tufts whereby the foreign matter may be lodged in said recesses, means adjacent the opposite end of said conveyor for picking the cotton lint from said tufts and for delivering it to said outlet, the foreign matter being carried back along the underside of said conveyor being released intermediate the ends of the conveyor by said spreader means, and an outlet passage in the bottom of said casing through which the foreign matter is discharged.

12. A device as in claim 11, comprising a valve mounted in said outlet for closing the same, said valve being held in a closed position by the suction within said casing for supporting the foreign matter thereon and for releasing the foreign matter when the suction within the casing is cut-off.

JOHN T. LAWRENCE.